D. S. Fisher,
Harrows.

N° 65,196.     Patented May. 28. 1867.

Witnesses:
Theo Tusche
J. A. Service

Inventor:
D. S. Fisher
Per [signature]
Attorneys

United States Patent Office.

D. S. FISHER, OF CEDAR SPRING, INDIANA.

Letters Patent No. 65,196, dated May 28, 1867.

---

HARROW.

---

The Schedule referred to in these Letters Patent and making part of the same.

---

TO ALL WHOM IT MAY CONCERN:

Be it known that I, D. S. FISHER, of Cedar Spring, in the county of Harrison, and State of Indiana, have invented a new and improved Harrow; and I do hereby declare that the following is a full, clear, and exact description thereof, which will enable others skilled in the art to make and use the same, reference being had to the accompanying drawings forming part of this specification.

This invention relates to a new and improved harrow of that class which rotate and are commonly termed revolving harrows. The invention consists in a novel construction and arrangement of the parts comprising the same, as hereinafter fully shown and described, whereby the harrows are allowed to rise and fall to conform to the inequalities of surface over which they may pass, and also rendered capable, when required, of being secured in a higher or lower fixed position, so that the teeth may penetrate more or less deeply into the earth. In the accompanying sheet of drawings—

Figure 1:
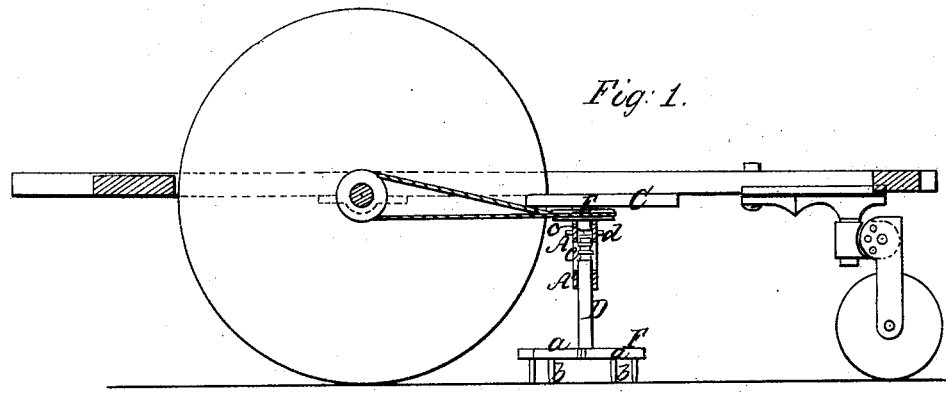
Figure 2:
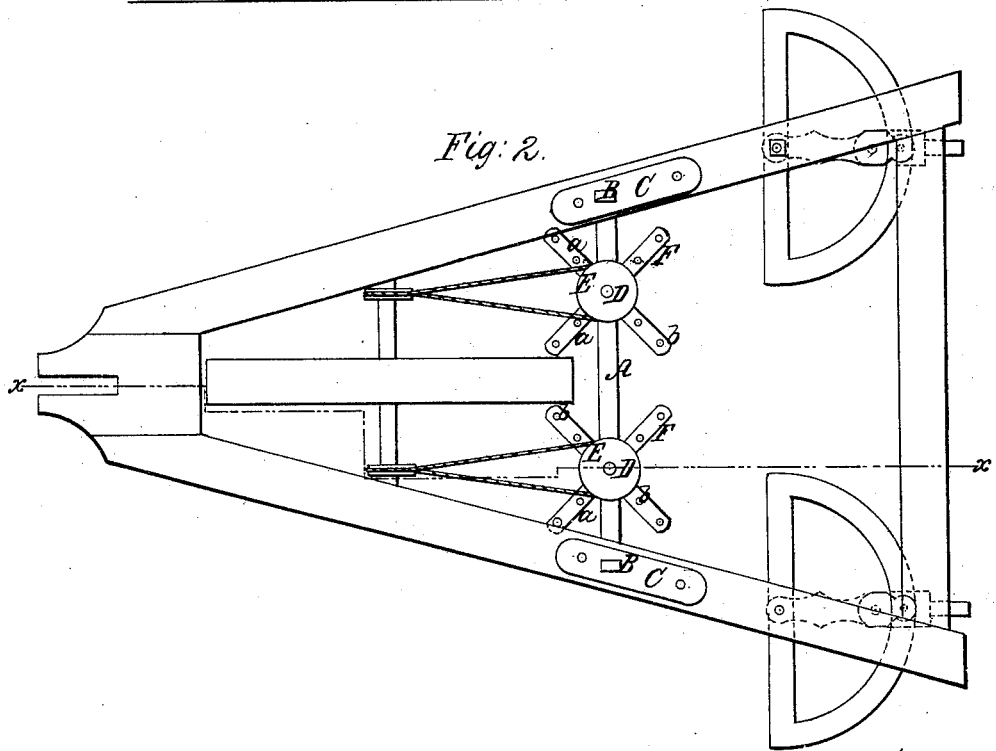

Figure 1 is a side sectional view of my invention, taken in the line $x\ x$, fig. 2.

Figure 2, a plan or top view of the same.

Similar letters of reference indicate like parts.

My improved harrow is designed to be used on a frame, which is shown in red, and capable of having various agricultural implements applied to it; such, for instance, as a corn-planter, wheat-drill, plough, and a reaper and mower. The parts which belong strictly to my improved harrow are shown in black, and consist of two bars A A'; framed at their ends into uprights B, having blocks C attached obliquely to their ends, said blocks being secured by bolts to the sides of the frame. These bars A A' have the upper parts of shafts D D fitted loosely in them; said shafts extending up through the upper bar A, and having pulleys E E on their upper ends, around which, and pulleys on the axle of the driving-wheel of the frame, belts pass, as shown in red, said belts driving the harrows as the machine is drawn along. The harrows F are secured to the lower ends of the shafts D D, and are composed of two cross-bars $a\ a$, having teeth $b$ attached thereto. The upper parts of the shafts D D have grooves $c$ made circumferentially in them, into any of which a pin, $d$, may be fitted to hold them at any desired height, according to the depth it is desired to have the teeth $b$ penetrate into the earth. The pins $d$ pass through the upper bar A. One is shown clearly in fig. 1. In certain cases, where the gravity of the harrows will not be sufficient to cause the harrow teeth to penetrate too deeply into the earth, the pins $d$ may be withdrawn, and the harrows will then rise and fall to accommodate themselves to the inequalities of surface over which they may pass. In very soft, or light, pliable earth, the pins $d$ should be used, as the harrow teeth would otherwise penetrate too deeply. In this case the harrows rise and fall with the framing to which they are attached.

Having thus described my invention, what I claim as new, and desire to secure by Letters Patent, is—

1. The revolving harrows F F, secured to the lower ends of the vertical shafts D D, which are fitted loosely in bars A A', or any suitable framing, substantially as and for the purpose set forth.

2. The circumferential grooves $c$, in the upper parts of the harrow shafts D D, in combination with the pins $d$, all arranged substantially as and for the purpose specified.

D. S. FISHER.

Witnesses:
J. EMMET ENLOW,
GEO. W. LAMB.